(12) United States Patent
Overkamp

(10) Patent No.: US 6,305,532 B1
(45) Date of Patent: Oct. 23, 2001

(54) TRAVEL TRAY HAVING ADJUSTABLE DRINK HOLDER

(76) Inventor: Scott T. Overkamp, 10244 Hoover St., Spring Hill, FL (US) 34608-4936

(*) Notice: Subject to any disclaimer, the term of this patent is extended or adjusted under 35 U.S.C. 154(b) by 0 days.

(21) Appl. No.: 09/577,851

(22) Filed: May 25, 2000

Related U.S. Application Data

(63) Continuation-in-part of application No. 09/327,281, filed on Jun. 4, 1999, now abandoned.

(51) Int. Cl.$^7$ ........................................................ B65D 1/36
(52) U.S. Cl. .......................... 206/217; 206/562; 206/563; 220/17.1; 220/556
(58) Field of Search .................................... 206/217, 562, 206/563; 220/556, 737, 738, 17.1; D6/406.1, 406.3; 297/148, 153

(56) References Cited

U.S. PATENT DOCUMENTS

| | | |
|---|---|---|
| D. 193,244 | 7/1962 | Bliss . |
| D. 301,820 | 6/1989 | Wasserman . |
| D. 308,450 | 6/1990 | Harris et al. . |
| D. 363,857 | 11/1995 | Sussman . |
| D. 405,621 | 2/1999 | Myers . |
| 2,647,716 | 8/1953 | Hudziak et al. . |
| 2,986,438 | 5/1961 | Smathers et al. . |
| 4,163,374 | * 8/1979 | Moore et al. ........................ 220/738 |
| 4,311,099 | 1/1982 | Roberts . |
| 4,562,926 | 1/1986 | Mode . |
| 5,005,702 | 4/1991 | Davis et al. . |
| 5,081,936 | 1/1992 | Drieling . |
| 5,497,885 | 3/1996 | Sussman . |
| 5,732,849 | * 3/1998 | Brooks ................................ 220/17.1 |
| 5,862,933 | * 1/1999 | Neville ................................ 220/17.1 |

* cited by examiner

Primary Examiner—David T. Fidei
(74) Attorney, Agent, or Firm—Ronald E. Smith; Smith & Hopen, P.A.

(57) ABSTRACT

A travel tray includes a flat support surface having a raised lip extending around its peripheral edge. A concave front wall is configured and dimensioned to accommodate the natural abdominal curvature of a user's torso. An aperture is formed in the support surface to receive a tapered beverage container of relatively large size. An adaptor is detachably secured to an annular raised lip that circumscribes the aperture. The adaptor reduces the diameter of the aperture so that it can accommodate a beverage container of smaller size. The adaptor ring is stored beneath the travel tray when not in use. The annular raised lip that circumscribes the aperture prevents spilled food or liquids from entering the aperture and spilling onto the user's lap. The raised lip that extends around the peripheral edge of the flat support surface provides the same function.

9 Claims, 2 Drawing Sheets

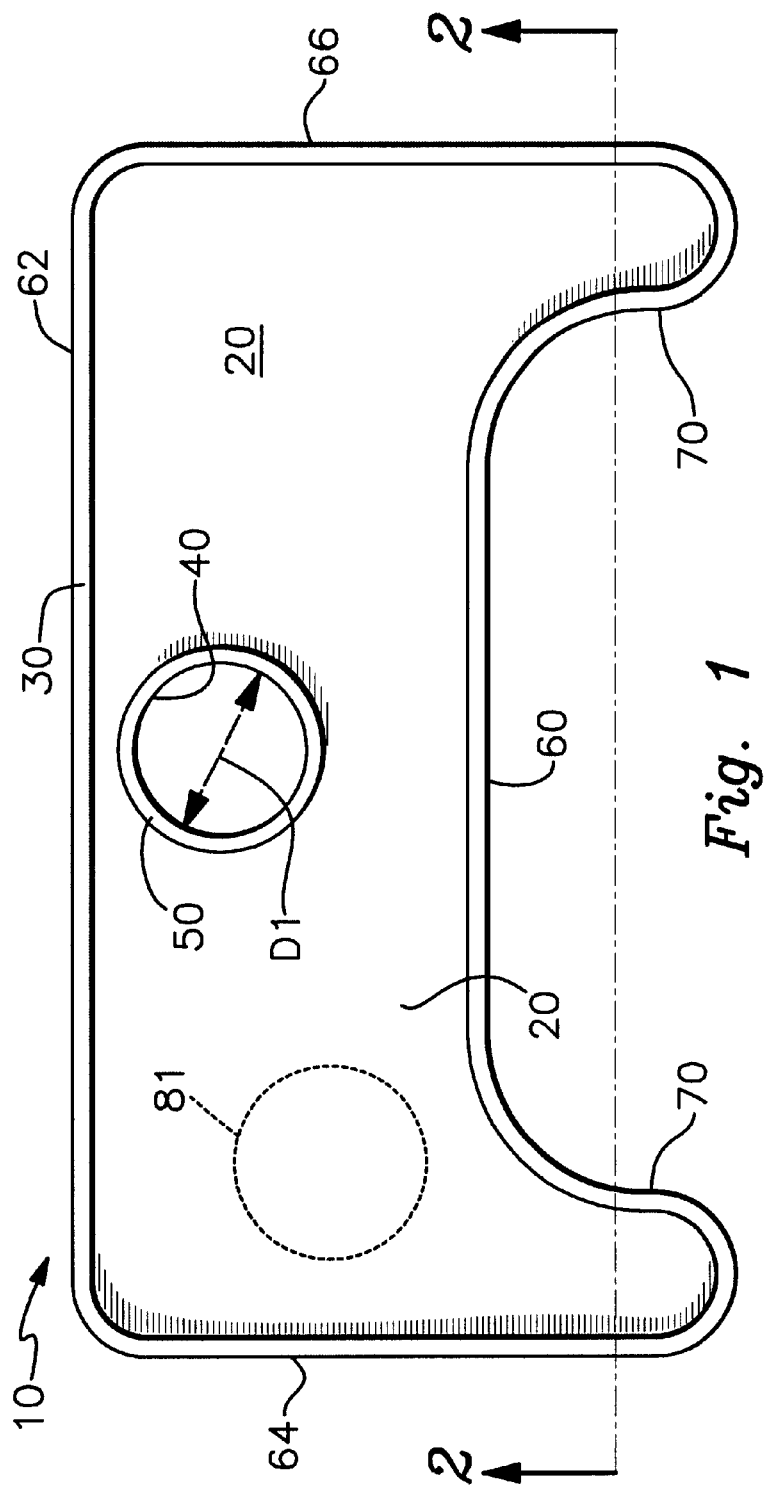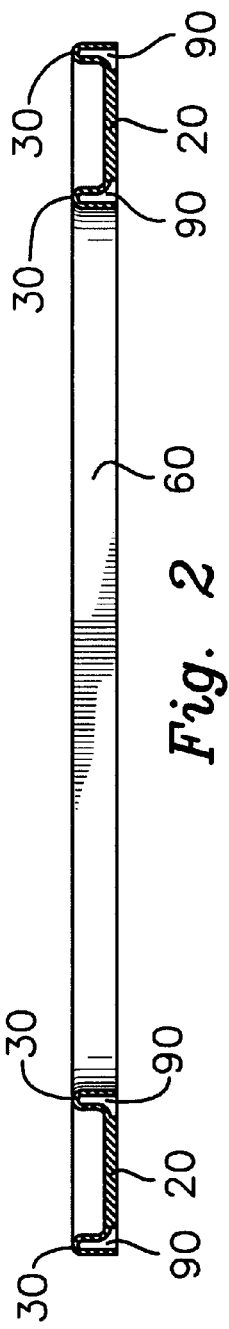

TRAVEL TRAY HAVING ADJUSTABLE DRINK HOLDER

CROSS-REFERENCE TO RELATED DISCLOSURES

This disclosure is a continuation-in-part of patent application Ser. No. 09/327,281, filed Jun. 4, 1999, now abandoned by the same inventor, entitled Laptop Eating Tray.

BACKGROUND OF THE INVENTION

1. Field of the Invention

This invention relates, generally, to a legless travel tray for holding food items and a beverage container on a user's lap, particularly in moving vehicles. More specifically, it relates to such a tray having an adaptor means that enables it to hold beverage containers of differing sizes.

2. Description of the Prior Art

This invention is directed to a travel tray that is durable and inexpensive to manufacture, yet which is also effective in providing a stable platform for food items and beverage containers when used in a moving land vehicle or watercraft.

Time-constraints sometimes dictate that a meal be consumed in a moving vehicle. Many people patronize fast-food restaurants that serve customers who do not exit their car to eat. Moreover, many families taking long trips bring food and beverages for consumption during the drive. However, many people find that eating in a vehicle can be inconvenient. Most vehicles are not designed with fold-down trays as found in passenger airliners or with dining tables as found in passenger trains. Accordingly, travelers are often required to place food items on their lap while eating, sometimes while trying to hold a beverage container between their knees. Food items and beverage containers tend to slide in response to lateral inertial forces generated by a turning vehicle or in response to longitudinal inertial forces caused by starting and stopping. Moreover, vibrations created by road conditions can also cause sliding and spillage. The spillage of hot beverages may even present a scalding hazard if skin contact is made. Typical trays or plates are not effective because they simply slide off a person's lap in response to such lateral and longitudinal inertial forces and vibrations.

Furthermore, many users do not have a flat stomach. Instead, they have a natural convex curvature to their abdomens, particularly while in a seated position. Typical rectangular trays do not accommodate their user's form and are therefore ineffective in staying in place.

Previous attempts have been made to provide a stable laptop tray for facilitating the consumption of food and beverages such as described in U.S. Pat. No. 4,562,926 to Mode ('926 patent); U.S. Pat. No. D405,621 to Myers ('621 patent); U.S. Pat. No. 5,005,702 to Davis et al. ('702 patent); U.S. Pat. No. 5,081,936 to Drieling ('936 patent); U.S. Pat. No. 5,497,885 to Sussman ('885 patent); and U.S. Pat. No. D308,450 to Harris et al. ('450 patent); all of which are incorporated hereinto by reference.

The '926 patent to Mode discloses a compartmented food place mat made from a one-piece paperboard blank. The invention does not include any design features to prevent sliding of the tray relative to a user's lap when lateral or longitudinal forces are applied. Furthermore, the '926 patent illustrates the beverage holder in an off-set position which may prove unstable when the tray is subjected to inertial forces.

The '621 patent to Myers discloses a design for a laptop food tray utilizing a hook-shaped member to underlie the thigh of the user for stability. The design patent illustrates the use of depressions to contain spillage and a beverage cup holder. However, the '621 patent requires the user to hook the apparatus under their thigh which could potentially interfere with the operation of a vehicle. The hook-shaped member also makes it difficult to store a plurality of the trays in a vertical stack.

The '702 patent to Davis et al. describes a portable tray having either a core of a resiliently compressed matrix or a plurality of air filled chambers. While the tray's design does provide some resistance to lateral slippage, the tray is bulky and difficult to store. Furthermore, these trays require a significant amount of material for their construction and are therefore expensive to manufacture and transport.

The '936 patent to Drieling describes a desk for laptop use with a concave front edge for conforming to the waist area of a user's body. As in much of the prior art, the '936 patent requires a significant amount of materials to produce and does not vertically stack in an efficient manner.

The '885 patent to Sussman describes a lap tray for carrying food comprising a flat base, a raised lip around the perimeter of the tray, a hole dimensioned to receive a beverage container and a pair of legs depending downward from either side of the tray to prevent lateral movement of the tray. However, the downwardly depending legs hinder the tray from being vertically stacked. Furthermore, the perfectly rectangular perimeter of the tray does not follow the natural abdominal curvature of most users.

The '450 patent to Harris et al. discloses a lap tray having a beverage cup holder, a perimeter lip and two concave channels on the underside to accommodate the legs of the user while in a seated position. The novel lap tray does not accommodate vertical stacking nor does it follow the curvature of most user's abdomens.

The known trays are also typically provided with legs that depend from a bottom surface thereof. The legs interfere with a user's comfort by forcing the user to either sit with the knees close together to avoid contact with the legs, or to sit with the knees wide apart for the same reason. Thus, a legless tray is desirable because it does not dictate the position of the user's knees with respect to one another.

It is well-known that fast food restaurants sell beverages in small, medium, and large sizes; extra large sizes are also quite common. It is therefore noteworthy that none of the prior art travel trays can accommodate beverage containers of differing sizes.

Consequently, there is a need for a legless laptop tray that resists sliding in response to inertial forces generated by a moving vehicle when it starts, stops, and turns.

There is a further need for a legless laptop tray that is easily stackable and storable for repeated use.

There is a further need for a legless laptop tray that securely holds a beverage in place on a user's lap.

There is a further need for a legless laptop tray that accommodates the natural abdominal curvature of most users.

A need also exists for a legless travel tray that accommodates beverage containers of differing sizes.

There is also a need for a legless laptop tray that fulfills all of the abovementioned needs while being durable yet inexpensive to manufacturer and distribute.

However, in view of the prior art considered as a whole at the time the present invention was made, it was not obvious to those of ordinary skill in the pertinent art how the identified needs could be fulfilled, nor was it obvious that a travel tray could be made to accommodate beverage containers of differing sizes.

SUMMARY OF THE INVENTION

The longstanding but heretofore unfulfilled need for a tray that provides all of the identified needs in the art of travel trays is now embodied by a new, useful, and non obvious invention. The novel tray of this disclosure is durable, vertically stackable, legless, and inexpensive to manufacture. It is also effective in providing a stable platform for food items and beverage containers when used in a moving vehicle or watercraft. Significantly, it accommodates beverage containers of all sizes.

The novel travel tray is a generally flat, legless member that includes a flat support surface upon which food items are placed. The flat support surface includes a laterally disposed front edge, a laterally disposed back edge, and longitudinally disposed opposite side edges, said edges collectively defining the peripheral edge of the support surface. A raised lip extends along said peripheral edge and provides a continuous barrier that prevents food items supported by the support surface from sliding off the tray. A beverage container-receiving aperture formed in the support surface, substantially centrally thereof, is adapted to receive a tapered beverage container therein. The aperture is preferably formed substantially in the center of the support surface so that the lower end of the beverage container may be further braced between the legs or knees of a user. A concavity that generally conforms to the size and shape of a user's torso is formed in the front edge of the tray. Accordingly, lateral displacement of the tray is substantially prevented by the user's torso.

An annular raised lip of hollow construction is formed along a peripheral edge of the beverage container-receiving aperture to prevent food from falling through the aperture when it is unoccupied by a beverage container. The raised lip that extends along the periphery of the support surface shares such hollow construction.-Exhibit Exhibit A attached hereto re-prints said paragraph as initially filed and includes brackets and underscorings to indicate deletions and additions, respectively, that were made to said paragraph as initially filed to produce the paragraph as once amended.

An adaptor ring clips onto the annular raised lip of the beverage-receiving aperture. The adaptor ring has a diameter less than the diameter of said beverage-receiving aperture so that said adaptor ring holds tapered beverage containers of smaller size than the beverage-receiving aperture. A storage ring is formed on an underside of the novel travel tray so that the adaptor ring may be conveniently stored when not in use.

The tray is preferably constructed of light-in-weight, inexpensive materials. For trays intended for disposable use, the construction material may be paper, paperboard, cardboard, or the like. However, for repeated use, the novel travel tray is preferably made of plastic because plastic is durable and easily cleaned.

Accordingly, it is an object of the present invention to provide a legless travel tray that resists sliding in response to inertial forces generated in a moving vehicle.

Another important object is to provide a legless travel tray that is easily stackable and storable.

Another object is to provide a legless travel tray that securely holds a beverage in place on a user's lap.

Yet another object is to provide a legless travel tray that accommodates the natural abdominal curvature of most users.

Another major object is to provide a legless travel tray that holds beverage containers of differing sizes.

Another object is to provide a legless travel tray that requires less construction material than many other travel tray designs.

Still another object is to provide a legless travel tray that performs all the abovementioned functions while being inexpensive to manufacturer and distribute.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a top plan view of a preferred embodiment of the novel travel tray according to the invention;

FIG. 2 is a sectional view taken along line 2—2 in FIG. 1;

DETAILED DESCRIPTION OF THE PREFERRED EMBODIMENT

Figure 3:
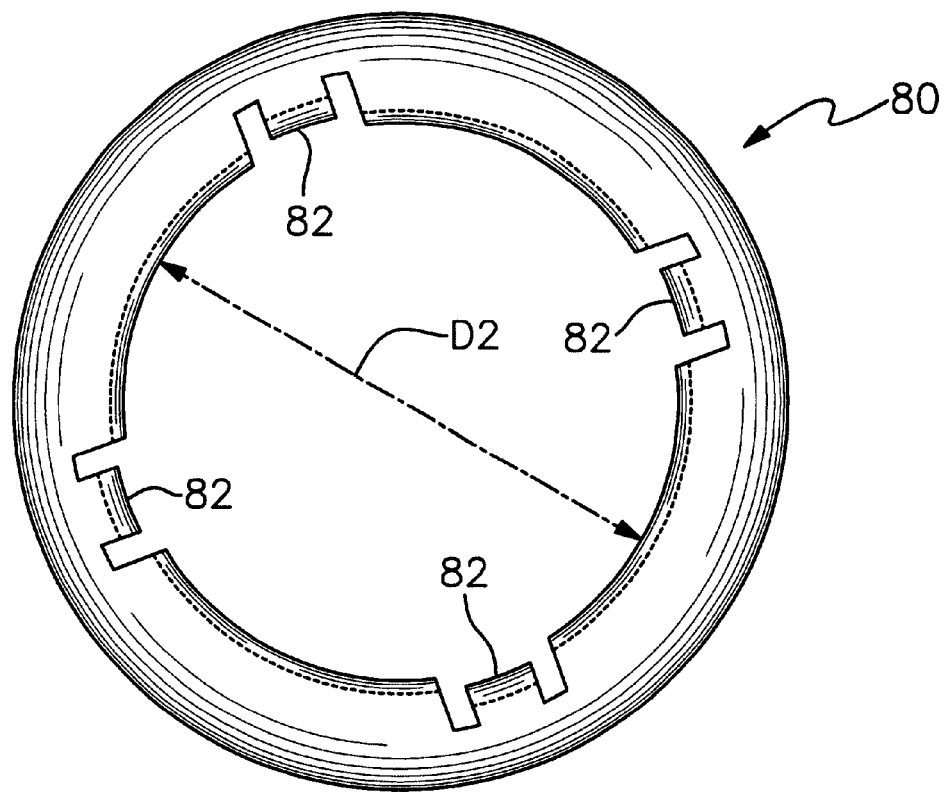
FIG. 3 is a top plan view of a novel adaptor ring.

Referring now to FIG. 1, it will there be seen that an illustrative embodiment of the present invention is denoted as a whole by the reference number 10. Travel tray 10 is provided in the form of a legless flat base member having a front edge 60, a back edge 62, opposite sides 64, 66 and a flat support surface 20 upon which food items are placed. Raised lip 30 extends along the peripheral edge of support surface 20 and provides a barrier that prevents food items and liquid from spilling over the peripheral edge of said support surface. In a preferred embodiment, the height of raised lip 30 is approximately $\frac{1}{4}^{th}$ inch. Aperture 40 having inner diameter $D_1$ is formed in support surface 20 and is adapted to receive a tapered drinking cup therein. Annular raised lip 50 is formed along the peripheral edge of aperture 40 to prevent food items and liquids from spilling into said aperture.

Concavity 70 is formed in front edge 60 and is configured and dimensioned to accommodate a user's torso when the user is in a sitting position.

FIG. 2 is a sectional view taken along line 2—2 in FIG. 1, and depicts the hollow structure 90 of raised lip 30. This hollow structure facilitates the vertical stacking of a plurality of trays and helps prevent stacked trays from sliding from the stack. It also saves materials. The novel structure may be formed of any suitable material. It is preferably formed of plastic because plastic is durable, easy to clean and inexpensive to manufacture.

Figure 4:
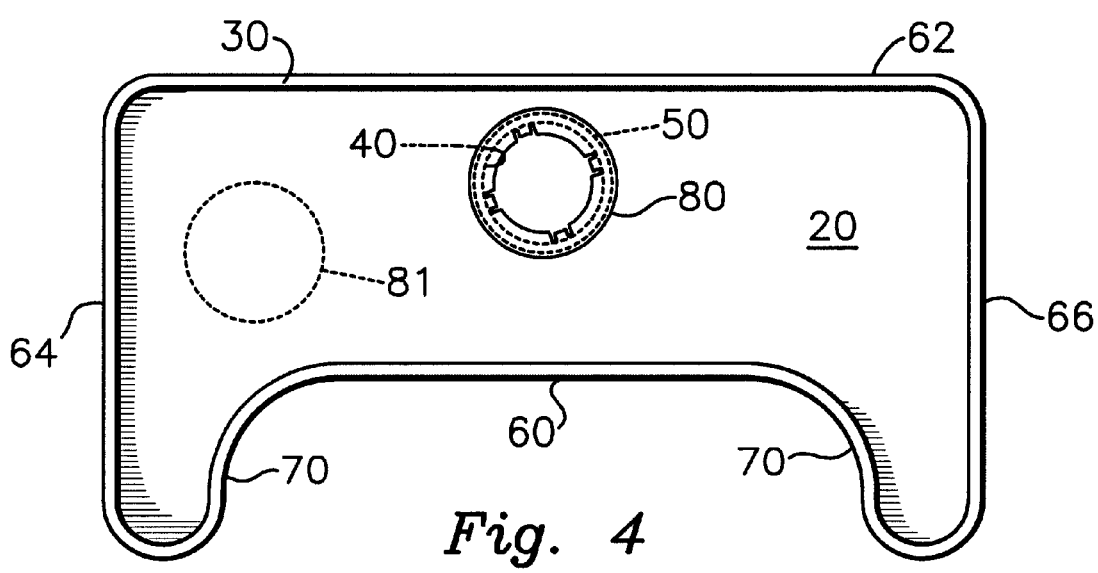
FIG. 4 is a top plan view of the novel tray when the novel adaptor ring is in use.

A novel adaptor ring 80 having inner diameter $D_2$ is depicted in the top plan view of FIG. 3. Its installed, functional relation to aperture 40 is depicted in FIG. 4. A plurality of substantially rigid but slightly flexible (in a radial direction) clips, collectively denoted 82, are formed in adaptor ring 80 about its periphery, in equidistantly and circumferentially spaced apart relation to one another. Each clip is positioned radially outwardly with respect to the inner diameter $D_2$ of adaptor ring 80. Adaptor ring 80 is made of a stiff yet slightly flexible plastic so that when adaptor ring 80 is pressed down firmly onto raised lip 50 that surrounds aperture 40, said clips are momentarily displaced in a radially inward direction until they slide over raised lip 50 and return to their respective positions of repose, under their own inherent bias, upon clearing the lowermost edge of said lip 50. When in repose, said clips engage the underside of raised lip 50 and prevent unwanted removal of adaptor ring 80. Manually squeezing the clips disengages them from the underside of raised lip 50 so that adaptor ring 80 can be removed. Adaptor ring 80 serves to reduce the diameter of aperture 40 so that it accommodates beverage containers of smaller size relative to those containers that are accommodated by aperture 40. In other words, diameter $D_2$ of adaptor ring 80 is less than diameter $D_1$ of aperture 40 by a preselected amount. This invention also contemplates the provision of a still larger adaptor ring that still further reduces the diameter of aperture 40 for accommodating still smaller beverage containers. There could be as many different sizes of adaptors as there are beverage container sizes.

Those skilled in the art of machine design will readily appreciate that clips 82 are a convenient and practical means for detachably securing an adaptor ring to raised lip 50, but that numerous alternative attachment means could be provided. For example, adaptor ring 80 could have a plurality of truncate pegs depending from a peripheral edge thereof and such pegs could be press fit into through bores or blind bores formed in support surface 20 in circumscribing relation to said aperture. The use of mating hook and loop fasteners would be contraindicated since they may become wet in the event of a spillage, but such fasteners are nonetheless within the scope of this invention, as are snap and buckle arrangements, frusto-conical adaptors that wedge into aperture 40, and so on. Although probably cost-prohibitive, an iris-like mechanism could be provided that would be permanently attached to raised lip 50. Such an iris mechanism could be infinitely adjustable to accommodate beverage containers of any size.

Many means for selectively reducing the diameter of aperture 40 are therefore within the scope of this invention. This travel tray is believed to be the first travel tray that can be adapted to hold beverage containers of differing sizes. It has a flat profile and as such is easily stackable and nestable. When a beverage container positioned within aperture 40 or the aperture of adaptor ring 80, or any equivalent structure, is held lightly between the knees of a user, the tray successfully holds food items and prevents spillage of the beverage even when the user, the tray, the food items on the tray, the beverage container and the beverage in the beverage container are all subjected to strong inertial forces.

Storage ring 81 is formed on an underside of the novel tray and has a diameter slightly less than that of adaptor ring 80 so that said adaptor ring 80 may be press fit therein to when not in use. Storage ring 81 is formed by a flat upstanding annular wall having a height sufficient to provide ample frictional engagement of adaptor ring 80 when said storage ring is press fit therein to.

A commercial embodiment of the novel legless travel tray weighs only 9.4 ounces and costs only ninety cents to manufacture. Four of them stacked together form a stack that is only 1.625 inches high and 2.35 pounds in weight. The tray is made of food grade plastic so that food can be eaten directly from it in the absence of a plate if desired. In a preferred commercial embodiment, the novel adaptor ring 80 permits the use of cup sizes up to 32 ounces.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A travel tray, comprising:
   a flat base member having a front edge, a back edge, opposite side edges and a support surface adapted to support food items;
   a raised lip extending along a peripheral edge of said support surface;
   an aperture formed in said support surface, said aperture adapted to receive therein a first tapered drinking cup having a first predetermined size;
   said aperture having a first predetermined diameter that enables a lower end of said drinking cup to extend through said aperture by a distance sufficient to enable a user of said tray to brace said lower end between said user's knees to prevent toppling over of said first tapered drinking cup even when a vehicle within which said travel tray is used is negotiating a curve at a high speed;
   an annular raised lip circumscribing said aperture;
   an adaptor ring that releasably engages said annular raised lip;
   said adaptor ring having a second predetermined diameter less than said first predetermined diameter so that when said adaptor ring is engaged to said raised annular lip, said adaptor ring holds a second tapered drinking cup having a second predetermined size less than said first predetermined size of said first tapered drinking cup.

2. The travel tray of claim 1, further comprising a concavity formed in said front edge, said concavity configured and dimensioned to accommodate a user's torso when said travel tray is placed on said user's lap.

3. The travel tray of claim 1, wherein said aperture is positioned substantially in the center of said base.

4. The travel tray of claim 1, wherein said raised lip has a hollow construction.

5. The travel tray of claim 1, wherein said tray is formed of plastic.

6. The travel tray of claim 1, further comprising a storage ring formed on an underside of said flat base member, said storage ring having a diameter slightly less than a diameter of said adaptor ring so that said adaptor ring may be press fit thereinto for storage when not in use.

7. The travel tray of claim 6, wherein said storage ring is formed of a flat, annular wall of predetermined height.

8. A travel tray, comprising:
   a flat base member having a front edge, a back edge, opposite side edges and a support surface adapted to support food items;
   a raised lip extending along a peripheral edge of said support surface;

an aperture formed in said support surface, said aperture adapted to receive therein a first tapered drinking cup having a first predetermined size;

said aperture having a first predetermined diameter;

an annular raised lip circumscribing said aperture;

an adaptor ring that releasably engages said annular raised lip;

said adaptor ring having a second predetermined diameter less than said first predetermined diameter so that when said adaptor ring is engaged to said raised annular lip, said adaptor ring holds a second tapered drinking cup having a second predetermined size less than said first predetermined size of said first tapered drinking cup; and a storage ring formed on an underside of said flat base member, said storage ring having a diameter slightly less than a diameter of said adaptor ring so that said adaptor ring may be press fit therein to for storage when not in use.

9. The travel tray of claim 8, wherein said raised lip has a hollow construction.

* * * * *